United States Patent [19]
Barvesten

[11] Patent Number: 5,933,773
[45] Date of Patent: Aug. 3, 1999

[54] METHOD AND A DEVICE FOR MOBILE TELEPHONE SUPERVISION

[75] Inventor: Mats Barvesten, Hjärup, Sweden

[73] Assignee: Telefonaktiebolaget LM Ericsson, Stockholm, Sweden

[21] Appl. No.: 08/854,685

[22] Filed: May 12, 1997

[30] Foreign Application Priority Data

May 13, 1996 [SE] Sweden ................................. 9601820

[51] Int. Cl.$^6$ ............................................ H04B 1/38
[52] U.S. Cl. ........................ 455/411; 455/558; 455/575; 455/186.1; 379/357; 380/23; 340/825.34
[58] Field of Search ................................... 455/410, 411, 455/418–420, 67.1, 73, 550, 551–553, 556, 557–559, 575, 90, 128, 186.1, 351; 380/23; 379/356, 357, 355; 340/325.31, 825.34

[56] References Cited

U.S. PATENT DOCUMENTS

| | | |
|---|---|---|
| 4,843,385 | 6/1989 | Borras . |
| 5,404,580 | 4/1995 | Simpson et al. ...................... 455/186.1 |
| 5,418,837 | 5/1995 | Johansson et al. ................... 455/186.1 |
| 5,444,764 | 8/1995 | Galecki . |
| 5,497,411 | 3/1996 | Pellerin ................................... 379/357 |

FOREIGN PATENT DOCUMENTS

| | | |
|---|---|---|
| 0607767 A1 | 7/1994 | European Pat. Off. . |
| 4242151 C1 | 3/1994 | Germany . |
| WO 95/26115 | 9/1995 | WIPO . |

*Primary Examiner*—Doris H. To
*Attorney, Agent, or Firm*—Burns, Doane, Swecker & Mathis, L.L.P.

[57] ABSTRACT

The invention relates to a method and to an arrangement for identifying an unauthorized user (A2) of a mobile telephone (M) that includes a terminal identity (m) and a chosen security code (PIN1). When the authorized owner (A1) has placed his/her authorized SIM-card (SIM1) in the mobile telephone (M) and has entered a security code (PIN1) into the mobile telephone (M), the mobile telephone ties a SIM-identity (s1) of the SIM-card (SIM1) to the terminal identity (m). If the authorized user (A1) loses his/her mobile telephone (M), the subscription is blocked. An unauthorized user (A2) purchases a subscription and is issued with a second SIM-card (SIM2), which he/she places in the mobile telephone (M). When the unauthorized user (A2) enters a security code (PIN2') that does not match the chosen security code (PIN1), the mobile telephone (M) compares the SIM-identity (s2) of the second SIM-card (SIM2) with the terminal identity (m). Since these identities (s2, m) do not match one another, the mobile telephone (M) automatically sends the identities (s2, m) to a service node (F), which confirms receipt of the identities by sending a response signal (RES) to the mobile telephone (M). The service node (F) is able to obtain personal user information (A2-info) from the database (D2) of the operator (P2) relating to the unauthorized user (A2) of the mobile telephone (M), via the SIM-identity (s2).

23 Claims, 4 Drawing Sheets

METHOD AND A DEVICE FOR MOBILE TELEPHONE SUPERVISION

FIELD OF INVENTION

The present invention relates to a method and to an arrangement for identifying a user of a mobile communications unit.

FIELD OF INVENTION

It is known to issue with each mobile communications unit a user card that has a unique user identity and that must be used with the mobile communications unit in order for the unit to be functional. The user card is tied to a subscriber to a specific operator.

Each mobile communications unit, which may be a mobile telephone or a cordless telephone for instance, has a terminal identity. This terminal identity may be the manufacture number or serial number of the unit, referred to in the European mobile telephone system, the GSM system, as the IMEI identity (International Mobile Equipment Identity). The IMEI identity is stored in a circuit in the mobile communications unit and cannot readily be accessed. The aforesaid user identity belonging to a specific user card is referred to in the GSM system as the IMSI identity (International Mobile Subscription Identity).

In the GSM system, the user card is referred to as the SIM-card and the IMSI identity may also be referred to as the SIM-identity.

When the owner of a mobile communications unit wishes to tie a mobile communications unit to a subscription, he or she applies to an operator for the purchase of a SIM-card. This card entitles the user to an operator subscription service via which the mobile communications unit is able to utilize those networks that belong to the operator.

In his/her application, the owner states the terminal identity of his/her mobile communications unit together with personal information, such as name, address, telephone number, personal identification number, this information being stored by the operator in a database or some like device. The operator may also store in the same location information relating to those services that the new owner may use. Services such as call billing are performed on the user card, for instance.

The operator assigns a unique user identity to the SIM-card, a so-called SIM-identity, which relates to the owner information stored in the database. The user identity may also include a unique identification code that identifies the operator which administers the subscription to which the SIM-card is tied.

Swedish Patent No. 9203351-3 teaches a mobile communications unit that can distinguish its own user card from other user cards.

If a mobile communications unit belonging to an authorised user is stolen by an unauthorised user, the authorised owner will report the theft to the operator that administers the subscription utilized by the stolen mobile communications unit. The operator is then able to block the user card in the stolen unit, wherewith the unit can no longer be used together with the blocked user card.

The unauthorised user is able to replace the existing user card in the unit with another user card that is allocated a user identity and therewith obtain access to the stolen mobile communications unit. The unauthorised user is then able to set up a call connection via the stolen mobile communications unit on the subscription belonging to the new user card.

It is known to prevent the use of a stolen mobile communications unit by an unauthorised user by blocking the stolen unit upon request from the owner, so as to render the unit unusable. In this case, the mobile communications unit is equipped with an authenticator that can be used by the operator to block the unit and therewith prevent its further use.

Another method of preventing an unauthorised user from using a stolen mobile communications unit is to require a special code to be keyed-in when one user card is replaced with a new user card, in order for the new user card to function together with the mobile communications unit. The mobile communications unit is otherwise unusable.

It is thus possible to prevent an unauthorised user from using a mobile telephone, although the unauthorised user will remain anonymous. It is not therefore possible to insure a mobile communications unit at present, because of the large number of mobile communication units that are stolen. Insured mobile communications units would result in large claims on respective insurance companies.

Patent Specification WO 95/26115 describes a mobile telephone that can be used when the IMSI identity of a SIM-card inserted into a mobile telephone coincides with the identity pre-stored in the mobile telephone. The mobile telephone compares the two identities and blocks further use of the mobile telephone when these identities do not coincide.

Thus, an operator is able to ensure that the mobile telephone can only be used with a SIM-card that belongs to the operator, this SIM-identity coinciding with the identity pre-stored in the mobile telephone. The mobile telephone will be blocked against further use when a user replaces the SIM-card with an unauthorised SIM-card.

U.S. Pat. No. 4,843,385 teaches a radio that can be blocked by keying a security identity into the radio. The radio is disabled in its blocked state, and therefore cannot be used. In order to unblock the radio, it is necessary to enter the correct identity. Otherwise, the radio automatically sends a message to the operator that has the identity of the radio, indicating that the wrong identity has been keyed-in, wherewith appropriate measures can be taken.

DISCLOSURE OF THE INVENTION

The present invention is concerned with the problem of ascertaining whether or not the user of a user card is authorised to use the card in a given telecommunications unit. This check shall be carried out without the user of the mobile communications unit being aware of the check.

Another problem with which the invention is concerned is one of enabling an unauthorised user of a mobile communications unit to be identified without forewarning the unauthorised user.

Accordingly, the object of the present invention is to ascertain whether or not a user of a mobile communications unit is authorised to use his/her user card in the unit, and to establish the identify of an unauthorised user of a mobile communications unit. This shall take place without either the user or the unauthorised user of the mobile communications unit being aware of these procedures.

To this end, it is proposed in accordance with the present invention that when inserting a user card into a mobile communications unit, the unit will automatically request the insertion of a security code. The user then enters a code into his/her mobile communications unit. If the security code entered is erroneous and the terminal identity and the user identity do not coincide with one another, the mobile communications unit automatically sends its own terminal identity and the user identity of the inserted user card to a service node.

The service node may be an insurance company with which the mobile communications unit is insured, or it may be the operator responsible for the subscription to which the user card is tied. The information associated with the user identity obtained from the mobile communications unit may then be used in the service node to take appropriate action, such as tracing an unauthorised user, for instance.

More specifically, the problem is solved by virtue of the authorised owner of the mobile communications unit stipulating the identity of the user card with which the mobile communications unit shall function, by entering a security code chosen by the authorised owner into said unit when the user card is placed therein. This automatically ties the user identity of the user card with the terminal identity such as to establish a specific relationship therebetween.

The mobile communications unit will ask for the security code automatically each time a user card is placed in the unit. If the security code entered in response to this request is not correct, or if the code is not entered into the unit, the unit will compare the user identity belonging to the inserted user card with the terminal identity. If these identities fail to show the aforesaid specific mutual relationship, the mobile communications unit stores the user identity and automatically sends both identities to the service node. The mobile communications unit then repeats this transmission of the stored user identity and the terminal identity without the user of the mobile communications unit being aware of this procedure, until the mobile communications unit receives a response signal from the service node. The service node confirms receipt of the user identity and the terminal identity transmitted by the mobile communications unit, by sending a response signal to the communications unit.

The mobile communications unit ceases to send stored user identity and terminal identity upon receipt of the response signal and erases the stored user identity.

The service node is then able to obtain information tied to the user identity, by contacting the operator of the subscription utilized by the user card in the mobile communications unit, and therewith identify the user of the user card inserted in said unit.

One advantage afforded by the present invention is that a stolen unit can be traced to the unauthorised user without the unauthorised user being aware of what is happening and without the unit being blocked. It is the mobile communications unit that sends the user identity and the terminal identity automatically to the service node.

Because the mobile communications unit repeatedly sends the stored user identity and the terminal identity when a mismatch is found until a response signal is obtained, without the user of the unit -being aware of what is happening, information relating to the user identity and the terminal identity stored in said unit will eventually be received in the service node even should the user be located temporarily in a radio-shielded place.

Another advantage is that the mobile communications unit is now insurable, because it can be traced to an unauthorised user. The present invention can also be used by the service node to check whether everything is in order, by contacting the authorised owner of the unit to ascertain whether or not a mistake has been made, for instance in the case of confusion between user cards.

Another advantage afforded by the invention is that the mobile communications unit can be marketed by the operator as being secure against theft, since unauthorised users that are aware of the modus operandi of the inventive electronics are not interested in possessing such a mobile communications unit.

The invention will now be described in more detail with reference to preferred exemplifying embodiments thereof and also with reference to the accompanying drawings.

DETAILED DESCRIPTION OF PREFERRED EMBODIMENTS

Figure 1A:
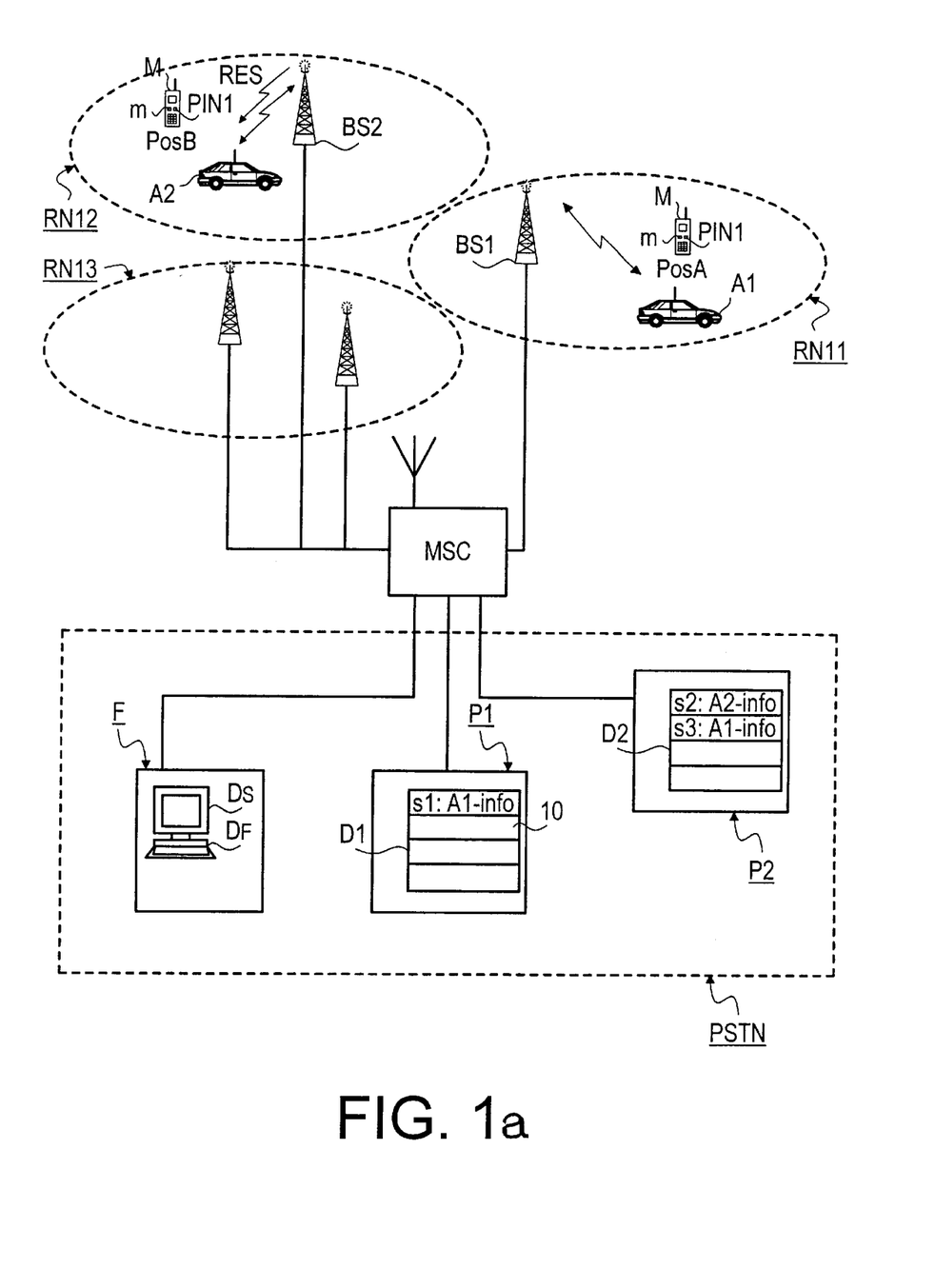
FIG. 1a is a schematic illustration of an inventive communications network.

FIG. 1a illustrates the construction of a communications network that includes one or more radio communications networks, such as, inter alia, a first radio communications network RN11, a second radio communications network RN12, and a third radio communications network RN13, and also a public switched telephone network, PSTN. Each radio communications network RN11, RN12, RN13 includes one or more base stations connected to a mobile services switching centre (MSC) which forms an interface against the public switched telephone network, PSTN, to which operators P1 and P2 and a service node F are also connected.

Several mobile telephone users are located in the radio communications network RN11, among them an authorised user A1, also called an owner, and a base station BS1 connected to the switching centre MSC. The owner A1 owns a mobile telephone M (FIG. 2) which is provided with an inaccessibly stored terminal identity, a so-called mobile identity m which has been registered by the owner A1 at the service node F. The mobile identity m identifies the mobile telephone M and may be the serial number of the telephone for instance. The service node F may be an insurance company used by one of the operators P1, P2.

Several mobile telephone users are present in the radio communications network RN12, among them an unauthorised user A2, and a base station BS2 that is connected to the mobile services switching centre MSC.

FIG. 1a shows the mobile telephone M and its mobile identity m in two different positions, i.e. a position PosA of the owner A1 and a position PosB of the unauthorised user A2.

Two operators P1 and P2 are connected to the mobile services switching centre MSC, and supply subscriptions for utilizing the radio communications networks RN11, RN12, RN13. The operator P1 stores information relating to its subscriber users in a database D1, and the operator P2 stores information relating to its user subscribers in a database D2, as described in more detail hereinafter.

The databases D1, D2 include storage fields 10 in which information relating to respective users A1, A2 of each user card, the SIM-cards SIM1, SIM2, SIM3 as described above is stored. When purchasing a SIM-cards SIM1, SIM2, SIM3 from the operator P1 or from the operator P2, the SIM-card SIM1, SIM2, SIM3 is given an associated SIM-identity s1, s2, s3, which is tied to corresponding information relating to the user A1, A2 of each SIM-card SIM1, SIM2, SIM3.

An identification code P1-id, P2-id included in the SIM-identity s1, s2, s3 identifies the operator P1, P2 with which the SIM-identity s1, s2, s3 is registered.

Figures 1B, 2:
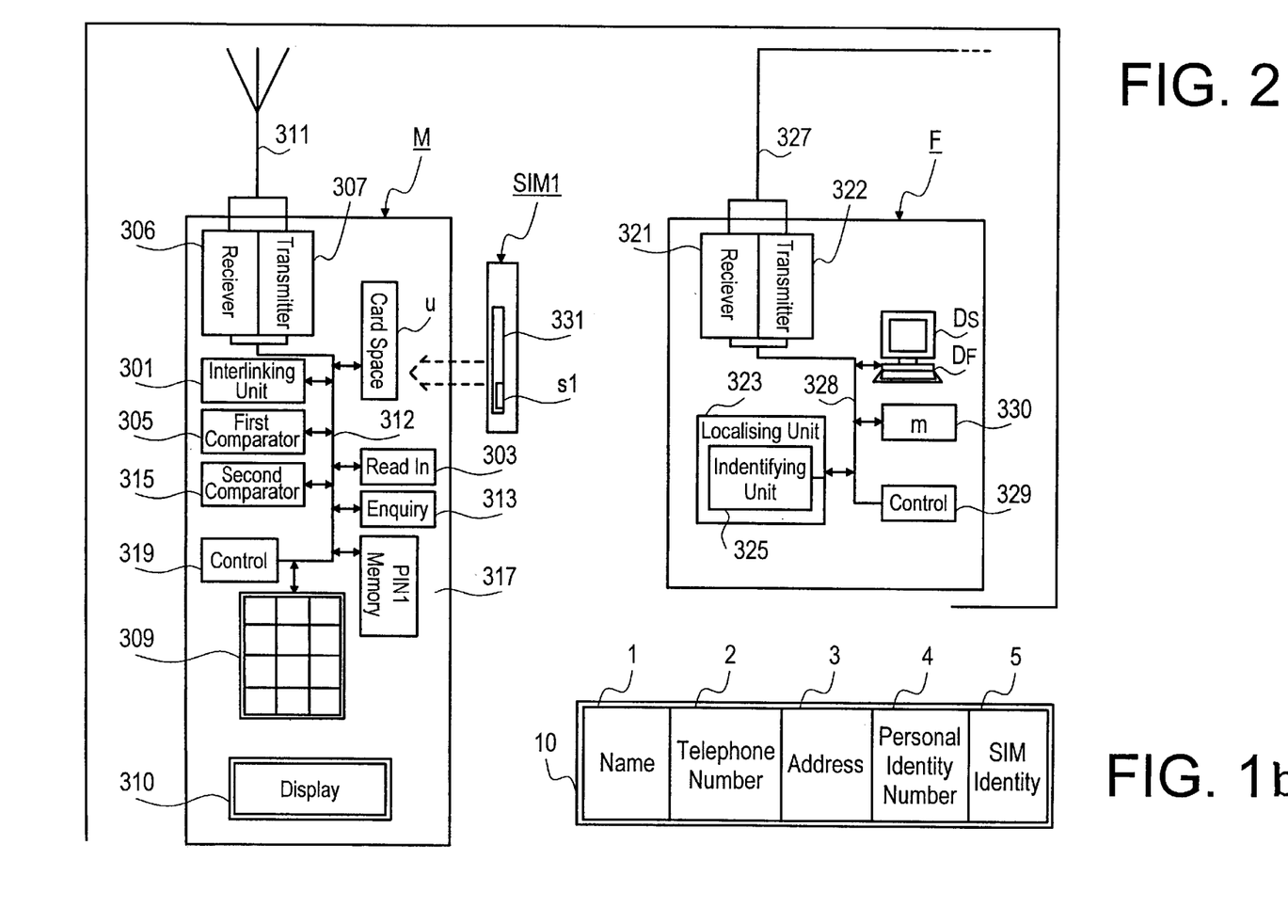
FIG. 1b is a graphic illustration of a database storage field for storing data in accordance with the invention.
FIG. 2 is a block schematic of a mobile telephone and a service node according to the invention.

FIG. 1b illustrates the possible construction of a storage field 10 in the databases D1, D2. The storage field 10 includes five storage units 1, 2, 3, 4 and 5 in which data can be stored. The names of respective users A1, A2 are stored in the first storage unit 1, the telephone number of respective users A1, A2 is stored in the second storage unit 2, the address of respective users A1, A2 is stored in the third storage unit 3, the personal identity number of respective users A1, A2 is stored in the fourth storage unit 4, and the aforementioned SIM-identity s1, s2, s3 tied to respective user information A1, A2 is stored in the fifth storage unit 5. The storage field 10 may include more than the aforesaid five storage units 1, 2, 3, 4, 5 when wishing to store more user information. When a particular piece of user information need not be stored in the storage field 10, a corresponding storage unit may be excluded. The order in which user information is stored in the storage units 1, 2, 3, 4, 5 may be different to that described, the illustrated construction of the storage field 10 being given merely by way of example.

FIG. 2 is a block schematic illustrating a mobile telephone M, a first SIM-card SIM1 and the aforedescribed service node F. The mobile telephone M includes, among other things, an interlinking unit 301, a card space u, a read-in unit 303, a first comparitor unit 305, a receiver 306, a transmitter 307, a keypad 309, a display 310, an enquiry unit 313, a second comparitor unit 315, a memory unit 317, and a control unit 319, these components being those illustrated in the Figure. The receiver 306 and the transmitter 307 are connected to an antenna 311. The units are interconnected by a databus 312.

The first SIM-card SIM1 includes, among other things, a processor 331, which is the component shown in the Figure. The SIM-identity S1, also shown in the Figure, allocated to the first SIM-card SIM1 is stored in the processor 331.

The service node F includes, among other things, a receiver 321, a transmitter 322, a localising unit 323, a computer unit $D_F$, a control means 329 and a registering unit 330. The receiver 321 and the transmitter 322 are connected to an antenna 327. The units are interlinked by a databus 328.

The memory unit 317 of the mobile telephone M is used to inaccessibly store the aforesaid mobile identity m and a chosen security code PIN1. This code is used by the owner A1 when he/she removes and replaces his/her first SIM-card SIM1 from and into the mobile telephone M respectively. The memory unit 317 is also used to temporarily store the SIM-identity s2, for instance. When the first SIM-card SIM1 is placed in the intended card space u in the mobile telephone M, the read unit 303 reads and registers the SIM-identity s1 belonging to the first SIM-card SIM1.

The enquiry unit 313 is used to ask the owner to enter his/her security code PIN1 in response to a request displayed on the display 310. The owner A1 enters a security code PIN1' on the keypad 309.

The first comparitor unit 305 is used to compare the entered security code PIN1' with the chosen, stored security code PIN1.

The interlinking unit 301 ties together and establishes a relationship between the mobile identity m and the SIM-identity s1 stored in the memory unit 317, as before described.

The second comparitor unit 315 in the mobile telephone M compares the registered SIM-identity s1 with the mobile identity m to ascertain whether or not the relationship established in the interlinking unit 301 has been fulfilled.

The units u, 301, 303, 305, 306, 307, 309, 313, 315, 317, 319 in the mobile telephone M are connected to the databus 312, through which the units communicate with one another. The control unit 319 in the mobile telephone M controls the various units u, 301, 303, 305, 306, 307, 309, 313, 315, 317 through the medium of the databus 312 and causes said units to perform desired operations in accordance with the method.

The localising unit 323 in the service mode F includes, among other things, an identifying unit 325 which identifies the operator P2 associated with a SIM-identity s2 received in the service node F, and the identifying unit 325 identifies the user A2 of the mobile telephone M. The component 325 is shown in the Figure.

The computer unit $D_F$ in the service node F functions to register incoming messages, such as the SIM-identity s2 and the mobile identity m, these messages being shown on the screen $D_S$ of the computer $D_F$.

The registration unit 330 is used to store the aforesaid mobile identity m and its corresponding owner A1.

The control means 329 in the service node F controls the various units 321, 322, 323, $D_F$, 325, 330 via the databus 328, said units 321, 322, 323, $D_F$, 325, 330 being connected to the databus 328.

An exemplifying embodiment will now be described with reference to FIGS. 1a and 2, wherein the owner A1 wishes to identify an unauthorised user A2 of a mobile telephone M that has been lost or stolen.

When using the mobile telephone M for the first time, the user A1 chooses a security code PIN1 and enters the code in the mobile telephone M. The mobile telephone M registers the chosen security PIN1 and the code is stored inaccessibly in the mobile telephone M.

The owner A1 later wishes to subscribe to operator P1 and therefore applies for a first SIM-card SIM1 that entitles him/her to the subscription services offered by the operator P1. The application includes the mobile identity m and personal information A1-info, such as the name, telephone number, address, personal identification number of the owner A1. The operator P1 stores the owner information A1-info in the storage field 10 in the database D1 in accordance with the above, and relates this information to the SIM-identity s1. The first SIM-card SIM1 is allocated the aforesaid SIM-identity s1 and the first SIM-card SIM1 is then delivered to the owner A1. The SIM-identity s1 includes the identification code P1-id of the operator P1.

The owner A1 can then place the first SIM-card SIM1 in the card space u in the mobile telephone M. The mobile telephone M senses that the first SIM-card SIM1 is in position in the card space u, wherewith the mobile telephone M reads-in the SIM-identity s1 of the first SIM-card SIM1. The mobile telephone M will then ask the owner to enter the security code PIN1, for instance in response to a request shown on the display 310. The owner A1 enters into the mobile telephone M a security code that he has himself chosen.

The mobile telephone M reads-in the entered security code PIN1' and compares this code with the chosen, stored security code PIN1. When these codes are in agreement, the mobile telephone M ties the SIM-identity s1 with the mobile identity m and registers the relationship that prevails between the SIM-identity s1 and the mobile identity m. The way in which this is carried out will be described below with reference to FIG. 2.

The owner A1 is now able to use the mobile telephone M and establish communication on the subscription tied to the operator P1.

It is now assumed that an unauthorised user A2 takes the mobile telephone M into his possession. The owner A1 informs the operator P1 that the mobile telephone M is missing. The operator P1 will then block the SIM-identity s1 of the first SIM-card SIM1 in the mobile telephone M, therewith making it impossible for the user A2 to use the mobile telephone M with the first SIM-card SIM1.

The unauthorised user A2 is assumed to wish to subscribe to the operator P2 and applies for a second SIM-card SIM2 with the operator P2, therewith entitling user A2 to the services afforded by the operator P2. In the same way as that described above, the user A2 submits an application which contains mobile identity m and personal information A2-info. The operator P2 stores the A2-info relating to the user A2 in the database D2 and relates this information to the SIM-identity s2. The SIM-identity s2 is tied to the second SIM-card SIM2 and the second SIM-card SIM2 is then delivered to the user A2. The SIM-identity s2 includes the operator identification code P2-id.

The user A2 then places the second SIM-card SIM2 in the card space u of the mobile telephone M, wherewith the mobile telephone M senses that the second SIM-card SIM2 is in position in the card space u. The mobile telephone M reads-in the SIM-identity s2 of the second SIM-card SIM2 and then asks the owner to enter the aforesaid security code PIN1, via the display. The user A2 enters a code PIN2' in the mobile telephone M.

The mobile telephone M reads the entered code PIN2' and compares this code with the chosen, stored security code PIN1. Since these codes do not agree, the mobile telephone M compares the SIM-identity S2 with the mobile identity M. This comparison shows that the aforesaid relationship between the SIM-identity s2 and the mobile identity m is invalid. The mobile telephone M then stores the SIM-identity s2 in a memory and automatically transmits the SIM-identity s2 and the mobile identity m.

A so-called SMS-service (Short Message Service) in the GSM system is used in the transmission of the SIM-identity s2 and the mobile identity m on a stand-alone dedicated control channel (SDCCH). The SIM-identity s2 and the mobile identity m are transmitted on the control channel SDCCH via the base station BS2 and the mobile services switching centre MSC to a computer $D_F$ included in the service node F. The SMS-service is used in the GSM system to send short text messages to and from a mobile telephone, such text messages being allowed to include a maximum of 160 alphanumerical characters.

The mobile telephone M periodically repeats the dispatch of the stored SIM-identity s2 and the mobile identity m at regular time intervals, each time interval having a duration of T-seconds, until the mobile telephone M receives a response signal RES. The message is sent repeatedly from the mobile telephone M in order to ensure that the base station BS2 will ultimately receive the SIM-identity s2 and the mobile identity m, for instance in the event of the mobile telephone M being located temporarily in an area in which it is screened radio-wise from the base station BS2.

The computer $D_F$ in the service node F receives and registers the SIM-identity s2 and the mobile identity m sent by the mobile telephone M and presents the same on the screen $D_S$ of the computer $D_F$. The computer $D_F$ then automatically sends to the mobile telephone M, via the switching centre MSC and the base station BS2, a response signal RES confirming the receipt and registration of the SIM-identity s2 and the mobile identity m. As in the aforedescribed case, the SMS-service is used to transmit the SIM-identity s2 and the mobile identity m on the control channel SDCCH.

Receipt and registration of the SIM-identity s2 and the mobile identity m in the computer $D_F$ can also be confirmed by sending the response signal RES manually from the computer $D_F$ in the same way as that described above.

The mobile telephone M ceases periodic transmission of the SIM-identity s2 and the mobile identity m upon receipt of the response signal RES, and then erases the SIM-identity s2 from its memory.

When the service node F becomes aware of the SIM-identity s2 and the mobile identity m received by the computer $D_F$ and presented on the screen $D_S$, the service node F reads the operator identification code P2-id from the SIM-identity s2 and therewith identifies the operator P2 with which the SIM-identity s2 is registered. The service node F then contacts the operator P2 and obtains from the operator database D2 personal information concerning the user A2, A2-info tied to the SIM-identity s2.

The service node F also contacts the owner A1 tied to the registered mobile identity m and checks whether an error has occurred or if the owner A1 has lost his mobile telephone M. Since it is assumed that the owner A1 has lost his mobile telephone M in the illustrated case, the service node F uses the personal information A2-info obtained from the operator p2 to trace the user A2 of the mobile telephone M.

A variant of the aforedescribed example will now be described.

As with the previous example, it is assumed that the owner A1 takes out a subscription with the operator P1 and is issued with a first SIM-card SIM1 tied to the SIM-identity s1, in which the operator identification code P1-id is included. The owner A1 places the first SIM-card SIM1 in the mobile telephone M and enters the security code PIN1' in response to a request made by the mobile telephone M, in accordance with the aforegoing. The mobile telephone M ties the SIM-identity s1 with the mobile identity m and registers the relationship that prevails between the SIM-identity s1 and the mobile identity m.

The owner A1 is now able to use his mobile telephone M and to establish communication on the subscription tied to the operator P1.

It is now assumed that the owner A1 wishes to take-out a new subscription with the operator P2. The owner A1 therefore applies for a third SIM-card SIM3 which will entitle him to use the new subscription with the operator P2. The application includes the mobile identity m and personal information A1-info relating to the owner A1. The personal information A1-info is stored in the database D2 by the operator P2, in the same way as that described above, and the personal information A1-info is related to the SIM-identity s3. The third SIM-card SIM3 is allocated the SIM-identity s3 and the third SIM-card SIM3 is then issued to the owner A1. The SIM-identity s3 includes the operator identification code P2-id.

The owner A1 places the third SIM-card SIM3 in the card space u of the mobile telephone M and enters the security code PIN1' in response to a request from the mobile telephone M. The mobile telephone M senses that the third SIM-card SIM3 is in place in the card space u and reads-in the SIM-identity s3 of the SIM-card SIM3 and the entered security code PIN1'.

The mobile telephone M then compares the entered security code PIN1' with the aforesaid chosen security code PIN1 stored in the telephone. The comparison finds that these codes match one another and the mobile telephone M ties the SIM-identity s3 with the mobile identity m and registers the relationship prevailing between the SIM-identity s3 and the mobile identity m.

The user A1 is now able to use the mobile telephone M to establish communication with the subscription tied to the operator P2.

It is assumed in this example that the owner A1 enters the wrong security code PIN4 in the mobile telephone M, after having placed the third SIM-card SIM3 in the card space u. The mobile telephone M will then read-in the erroneous security code PIN4 and compare it with the aforesaid security code PIN1 chosen by the owner A1. The comparison shows that these codes do not match and the mobile telephone M will continue by comparing the SIM-identity s3 allocated to the third SIM-card SIM3 with the mobile identity m. Because the SIM-identity s3 and27 the mobile identity m are not tied together by the mobile telephone M, the comparison will show that the aforesaid relationship between the SIM-identity s1 and the mobile identity m is invalid with respect to the SIM-identity s3 and the mobile identity m. The mobile telephone M then stores the SIM-identity s3 in its memory and automatically dispatches the SIM-identity s3 and the mobile identity m.

The mobile telephone M uses the aforedescribed SMS-service to dispatch the SIM-identity s3 and the mobile identity m on the control channel SDCCH. The SIM-identity s3 and the mobile identity m are sent on the control channel SDCCH to the computer $D_F$ in the service node F, via the base station BS1 and the switching centre MSC.

The mobile telephone M continues to transmit the stored SIM-identity s3 and the mobile identity m at regular intervals until it receives the response signal RES, as described above.

The computer $D_F$ in the service node F receives and registers the SIM-identity s3 and the mobile identity m sent by the mobile telephone M, and presents the same on the computer screen $D_S$. The computer $D_F$ then automatically sends a response signal RES to the mobile telephone M, via the switching centre MSC and the base station BS1, in acknowledgement of the receipt of said identities. As in the earlier case, the SMS-service is used to send the SIM-identity s3 and the mobile identity m on the control channel SDCCH.

The mobile telephone M ceases to send the SIM-identity s3 and the mobile identity m upon receipt of the response signal RES and then erases the stored SIM-identity s3 from its memory.

When the service node F notices on the computer screen $D_S$ that the computer has received the SIM-identity s3 and the mobile identity m, the service node F runs a check on the owner A1 of the registered mobile identity m. The service node F takes no further action when an error has occurred.

A further alternative to the aforedescribed example is one in which the owner A1 applies for the first SIM-card SIM1 from the operator P1 with the intention of obtaining a subscription, as described above. As in the previous case, the operator P1 stores the personal information A1-info relating to the SIM-identity s1 in the database D1 and allocates the first SIM-card SIM1 the SIM-identity s1 in which the operator identification code P1-id is included.

The owner A1 places the first SIM-card SIM1 in the intended card space u and enters the security code PIN1' in response to a request from the mobile telephone M. The mobile telephone M senses that the first SIM-card SIM1 is in position in the card space u and reads-in the SIM-identity s1 of the first SIM-card SIM1 and the entered security code PIN1'.

The mobile telephone M compares the entered security code PIN1' with the aforementioned chosen and stored security code PIN1. The comparison shows that these codes are identical and the mobile telephone M then ties the SIM-identity s1 with the mobile identity m and registers the relationship that prevails between the SIM-identity s1 and the mobile identity m.

The owner A1 is now able to use the mobile telephone M for communication on the subscription tied to the operator P1.

Assume that the owner A1 removes the first SIM-card SIM1 and then places the first SIM-card SIM1 in the intended card space u in the mobile telephone M. The mobile telephone M then senses the presence of the first SIM-card SIM1 and reads-in the SIM-identity of the first SIM-card SIM1 and asks for the chosen, stored security code PIN1 to be entered.

Assume that the owner A1 enters an erroneous security code PIN3. The mobile telephone M reads-in the entered security code PIN3 and compares this code with the chosen, stored security code PIN1. This comparison shows that the entered security code PIN3 is erroneous. The mobile telephone M then makes a comparison between the SIM-identity s1 and the mobile identity m. This comparison shows that the aforesaid relationship between the SIM-identity s1 and the mobile identity m is valid and no further procedures are carried out in the mobile telephone M.

The owner A1 is therewith able to use the mobile telephone M and communicate on the subscription tied to the first SIM-card SIM1.

The mobile telephone M will compare the SIM-identity s1 with the mobile identity m, even in the case when the owner A1 neglects to enter the security code PIN1 as requested by the mobile telephone in the previous examples. The comparison shows that the aforesaid relationship between SIM-identity s1 and the mobile identity m to be valid, wherewith no further procedures are carried out in the mobile telephone M.

Figure 3A:
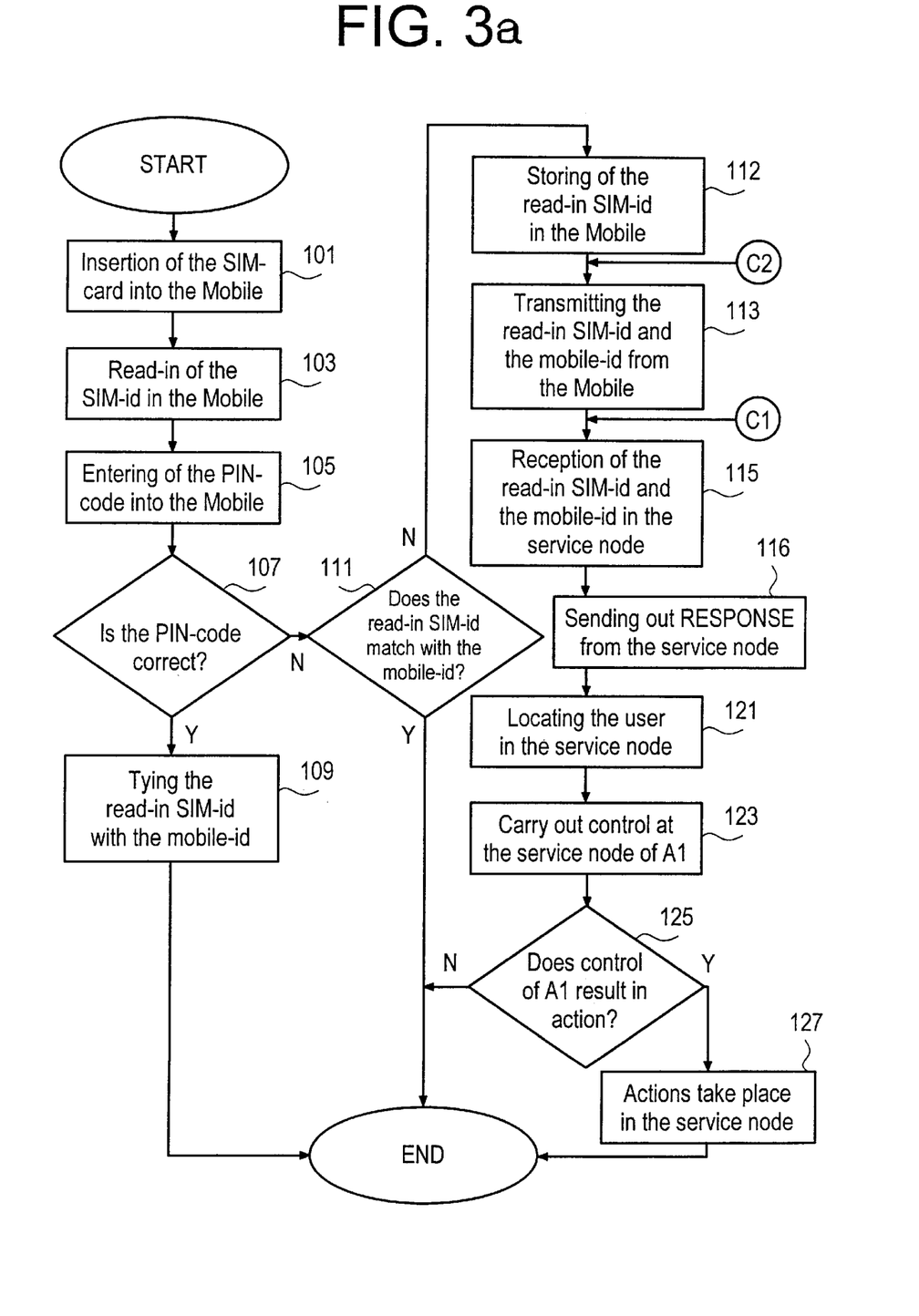
FIG. 3 is a flowchart that illustrates the inventive method.
Figure 3B:
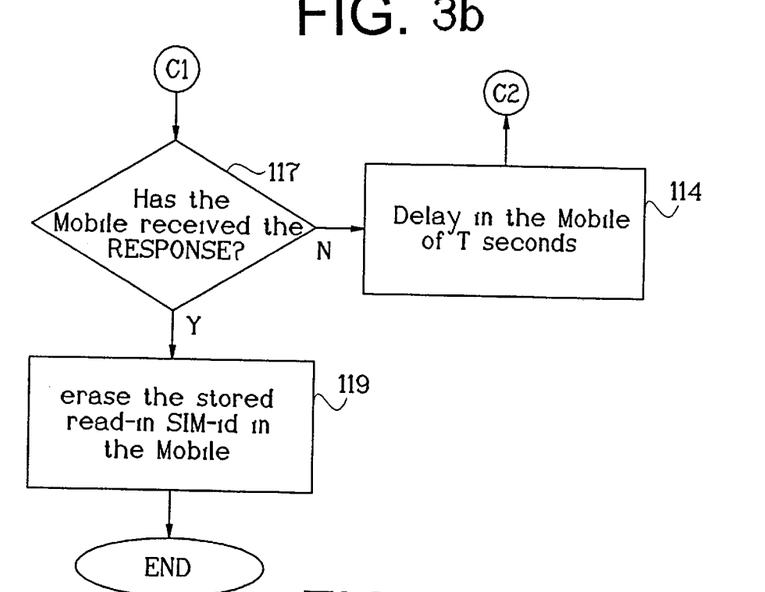

FIGS. 3a and 3b are flow charts which illustrate the inventive method as described in the previous examples. The mobile identity m and the security code PIN1 chosen by the telephone owner A1 are stored in the mobile telephone M. The owner A1 has registered the mobile identity m with the service node F, see above.

The method is commenced with the owner A1 placing the first SIM-card SIM1 in the card space u intended in the mobile telephone M, step 101. The first SIM-card SIM1 entitles the user to subscription services provided by the operator P1, and the SIM-identity s1 allocated to the first SIM-card SIM1 is tied to personal information A1-info related to the owner A1, this information being stored in the database D1 of the operator P1 as described above. The SIM-identity s1 includes the operator identification code P1-id.

The mobile telephone M senses the presence of the first SIM-card SIM1 in the card space u and reads-in the SIM-identity s1 belonging to the first SIM-card SIM1 in step 103, and asks for the security code PIN1 to be entered.

The owner A1 enters the security code PIN1' in step 105, and the mobile telephone M reads-in said code PIN1'. The mobile telephone M then compares the entered security code PIN1' with the chosen, stored security code PIN1 in step 107. The comparison shows that these codes are identical, in accordance with an alternative Y. In step 109, the mobile telephone M ties the read-in SIM-identity s1 to the mobile identity m and registers the relationship that prevails between the SIM-identity s1 and the mobile identity m.

An unauthorised user A2 takes the mobile telephone M and replaces the first SIM-card SIM1 with a second SIM-card SIM2 that entitles the user to the subscription services provided by the operator P2, and the SIM-identity s2 allocated to this second SIM-card SIM2 is tied to personal information A2-info relating to the user A2 and this information is stored in the database D2 of the operator P2. The SIM-identity s2 includes the operator identification code P2-id.

In step 101, the user A2 places the second SIM-card SIM2 in the intended card space u in the mobile telephone M.

The mobile telephone M senses the presence of the second SIM-card SIM2 in the card space u and, in step 103, reads-in the SIM-identity s2 and requests the security code PIN1 chosen by the owner A1, in accordance with the above.

In step 105, the user A2 enters the security code PIN2' and the mobile telephone M reads-in the entered security code PIN2'. The mobile telephone M then compares the entered security code PIN2' in step 107 with the chosen, stored security code PIN1, this comparison showing a mismatch in accordance with an alternative N.

In step 111, the mobile telephone compares the read-in SIM-identity s2 with the mobile identity m, this comparison showing that these identities do not fulfil the above-mentioned tied relationship, in accordance with alternative N. In step 112, the mobile telephone M then stores the read-in SIM-identity s2 in the memory and transmits the read-in SIM-identity s2 and the mobile identity m in step 113. The mobile telephone M uses in this transmission the aforesaid SMS-service and transmits the SIM-identity s2 and the mobile identity m to the computer $D_F$ in the service node F on the control channel SDCCH, via the base station BS2 and the switching centre MSC.

According to a method step 117 in FIG. 3b, a check is run in the mobile telephone M to ascertain whether or not a response signal RES has been received from the service node F. This is referenced C1 in FIGS. 3a and 3b. If no such response signal has been received, according to alternative N, the mobile telephone M continues in step 114 to repeatedly transmit the SIM-identity s2 and the mobile identity m stored in step 113 at regular time intervals, where each time interval has a duration of T-seconds. This is referenced C2 in FIGS. 3a and 3b.

In step 115, the computer $D_F$ in the service node F receives and registers the SIM-identity s2 and the mobile identity m sent by the mobile telephone M and presents these identities on the computer screen $D_S$. The computer $D_F$ confirms receipt and registration of the SIM-identity s2 and the mobile identity m by sending a response signal RES to the mobile telephone M via the switching centre MSC and the base station BS2, in step 116. As in the previous case, the SMS-service is used to dispatch the SIM-identity s2 and the mobile identity m on the control channel SDCCH.

The mobile telephone M receives the response signal RES in accordance with an alternative Y in step 117 and therewith ceases its periodic transmission of the SIM-identity s2 and the mobile identity m, wherewith the mobile telephone M erases the stored SIM-identity s2 from its memory in step 119.

The service node F then contacts the operator P2 identified by the identification code P2-id in step 121, in accordance with the aforegoing. The service node F is supplied with user personal information A2-info from the operator database D2 by the operator P2, this information A2-info being tied to the SIM-identity s2 received in the service node F. This personal information A2-info can be used by the service node F to identify the user A2 of the mobile telephone M having the mobile identity m, in step 121.

In step 123, the service node F contacts the owner A1 tied to the registered mobile identity m and checks whether a mistake has occurred or whether the owner A1 has had his mobile telephone M stolen, for instance.

Since the owner A1 in this example has had his mobile telephone M stolen, it is necessary for the service node to take the steps required in accordance with alternative Y in step 125. These measures are carried out in step 127 and may involve the service node F using the personal information A2-info received from the operator P2 to trace the user A2 of the mobile telephone M.

In the case when the owner A2 of the mobile telephone M in the previous example is assumed to place in the mobile telephone M a third SIM-card SIM3 that is not tied to the mobile identity m in step 101, and the owner A1 enters a wrong security code PIN3 in the mobile telephone M at the same time in step 107, or refrains from entering the security code PIN1', the check carried out by the service node F with respect to the owner A1 in step 123 may result in the service node F refraining from further action in accordance with an alternative N in step 125.

An alternative embodiment of the invention will now be described with reference to FIGS. 3a and 3b and to the previous example.

As described above, the owner A1 applies for a subscription with operator P1 and therewith receives the first SIM-card SIMI having the allocated SIM-identity s1 that includes the identification code P1-id. In step 101, the owner A1 places the SIM-card SIM1 in the intended card space u in the mobile telephone M. According to the aforedescribed method, this results in the mobile telephone M tying the SIM-identity s1 with the mobile identity m in step 109 and registering the relationship that prevails between the SIM-identity s1 and the mobile identity m.

It is assumed that the owner A1 removes the first SIM-card SIM1 from the mobile telephone M and then places the first SIM-card SIM1 back into the card space u in the mobile telephone M, in accordance with step 101. The mobile telephone M will therewith sense the presence of the first SIM-card SIM1 in the card space u and, in step 103, read-in the SIM-identity s1 of the SIM-card SIM1 and present on the display a request for the owner A1 to enter the aforesaid chosen, stored security code PIN1.

In step 105, the owner A1 is assumed to enter the wrong security code PIN3. The mobile telephone M reads-in the entered security code PIN3 and compares this code with the chosen, stored security code PIN1. This comparison shows that the security code PIN3 does not agree with the security code PIN1, step 107. The mobile telephone M continues to compare the read-in SIM-identity s1 with the mobile identity m, step 111, wherein this comparison shows that the SIM-identity s1 and the mobile identity m fulfil the relationship in the previous example, wherewith alternative Y is applied and no further measures are carried out in the mobile telephone M.

Figure 4:
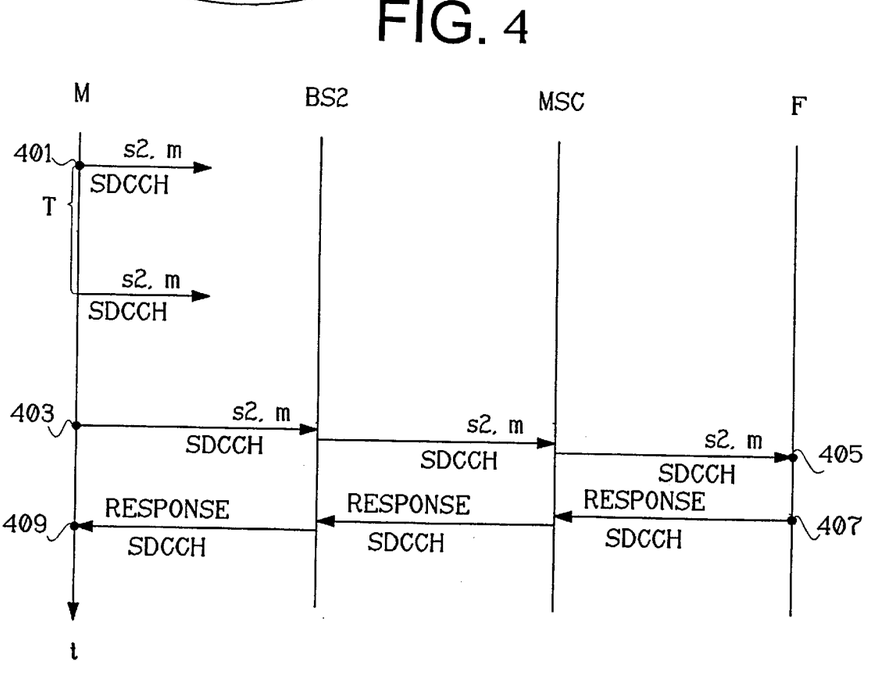
FIG. 4 is a signalling diagram that illustrates signalling between the mobile telephone and the service node in accordance with the invention.

The aforementioned signalling on control channel SDCCH will now be described with reference to a signalling schema given in FIG. 4. The vertical lines indicate events occurring in the mobile telephone M, the base station BS2, the mobile services switching centre MSC and the service node F in a time sequence, wherein the time is referenced t in the Figure.

As described in the aforegoing, the owner A1 has in his possession the mobile telephone M having the mobile identity m, which is registered in the service node F. The owner A1 applies for the use of a subscription offered by the operator P1, wherewith the owner A1 receives from the operator P1 the first SIM-card SIM1 having the allotted SIM-identity s1, as described fully in the aforegoing. The SIM-identity s1 includes the operator identification code P1-id.

The owner A1 then places the first SIM-card SIM1 in the card space u in the mobile telephone M and then enters the security code PIN1 in response to a request made by the mobile telephone M, wherewith the mobile telephone M ties the SIM-identity s1 of the first SIM-card SIM1 to the mobile identity m.

The owner A1 is now able to use the mobile telephone M for communication on the subscription tied to the operator P1.

It is now assumed that the unauthorised user A2 takes possession of the mobile telephone M and that the owner A1 reports the loss to the operator P1 and that the operator duly blocks the SIM-identity s1 of the first SIM-card SIM1 in the mobile telephone M. The unauthorised user A2 is now unable to use the mobile telephone M with the first SIM-card SIM1.

It is also assumed that the user A2 wishes to subscribe to the services offered by the operator P2 and submits to the operator P2 an application for a second SIM-card SIM2 that will entitle the user to use the services afforded by operator P2. In the same way as that described above, the user A2 includes in his application the mobile identity m together with user personal information A2-info. The operator P2 stores the user personal information A2-info in the database D2 and relates this information to the SIM-identity s2. The SIM-identity s2 is tied to the second SIM-card SIM2 and the second SIM-card SIM2 is then delivered to the user A2. The SIM-identity s2 includes the operator identification code P2-id.

It is assumed that the user A2 moves to a place in which he is shielded radio-wise from the base station BS2, and that the user A2 places the second SIM-card SIM2 in the telephone card space u. The mobile telephone M senses the presence of the second SIM-card SIM2 in the card space u and reads-in the SIM-identity s2 of the second SIM-card SIM2. The mobile telephone M then displays a message requesting the aforesaid security code PIN1 to be entered. The user A2 then enters the code PIN2' in the mobile telephone M.

The mobile telephone M reads-in the entered code PIN2' and compares this code with the chosen, stored security code PIN1, as in the aforedescribed cases. Since these codes do not match, the mobile telephone M compares the SIM-identity s2 with the mobile identity m. This comparison shows that the aforesaid relationship between the SIM-identity s2 and the mobile identity m is not fulfilled. The mobile telephone M therewith stores the SIM-identity s2 in its memory and automatically sends the SIM-identity s2 and the mobile identity m on the control channel SDCCH, as illustrated at point 401 in FIG. 4.

The mobile telephone M continues to send the aforesaid identities s2 and m at regular time intervals of T-seconds duration, as shown in the Figure, and awaits a response signal RES from the computer $D_F$ in the service node F.

The user A2 is assumed to move from the radio-wise screened place, wherewith the SIM-identity s2 and the mobile identity m that have been repeatedly transmitted by the mobile telephone M will finally reach the base station BS2 at point 403. The mobile telephone M utilizes the aforedescribed SMS-service to transmit the SIM-identity s2 and the mobile identity m on the control channel SDCCH to a point 405 in the Figure, via the base station BS2 and the switching centre MSC, where the computer $D_F$ in the service node F receives and registers the SIM-identity s2 and the mobile identity m.

The SIM-identity s2 and the mobile identity m received and registered by the computer $D_F$ are shown on the screen $D_S$. The computer $D_F$ then sends the response signal RES to the mobile telephone M on the control channel SDCCH at point 407 in the Figure, via the switching centre MSC and the base station BS2 in the aforedescribed manner.

The mobile telephone M receives the response signal RES at point 409, wherewith the mobile telephone ceases to transmit the SIM-identity s2 and the mobile identity m and erases the stored SIM-identity s2 from its memory.

The service node F notices that the computer $D_F$ has received the SIM-identity s2 and the mobile identity m and therewith reads from the operator identification code P2-id included in the SIM-identity s2 the identity of the operator P2 with which the SIM-identity s2 is registered. The service node F then contacts the operator P2 and receives from the operator P2 personal information A2-info taken from the database D2 tied to the SIM-identity s2 and to the user A2.

The service node F checks with the owner A1 tied to the registered mobile identity m. Since the owner A1 has lost possession of his mobile telephone M, the service node F uses the personal information A2-info received from the operator P2 to trace the user A2 of the mobile telephone M.

As an alternative to the mobile telephone M transmitting the SIM-identity s2 and the mobile identity m at regular time intervals until the response signal RES is received, the mobile telephone M may be constructed to transmit the SIM-identity s2 and the mobile identity m on the control channel SDCCH each time the user A2 sets up a call connection on the second SIM-card SIM2 via the mobile telephone M, without the user A2 being aware of this transmission. This procedure is continued until the mobile telephone M receives the response signal RES, at point 409 in accordance with the aforegoing. Other possibilities are also feasible.

In a mobile telephone system other than the GSM system, services similar to the SMS-service may be used and channels other than the SDCCH channel may be used to transmit said messages and signals between the mobile telephone M and the service node F. Similarly, channels other than the SDCCH channel of the GSM system may be used.

The aforesaid SIM-identities s1, s2 and s3 are corresponded by the IMSI identity (International Mobile Subscription Identity) in the GSM system, and the mobile identity m is corresponded by the IMEI identity (International Mobile Equipment Identity) in the GSM system. Mobile telephone systems other than the GSM system use user cards with associated user identities similar to the SIM-card.

It will be understood that the invention cannot be applied when the user A1 does not choose a security code PIN1 in the aforedescribed examples when using the mobile telephone M for the first time.

I claim:

1. A method of identifying the user of a mobile communications unit in a mobile communications system, wherein the unit has a terminal identity and a security code that has been chosen by an authorized user, wherein said unit includes a card space for receiving a user card which has a user identity and is tied to an operator subscription, wherein one of the user identities corresponding to an authorized user card is linked to the terminal identity, and wherein the method comprises the steps of:

placing the user card in the card space of the mobile communications unit;

registering the user identity of the inserted user card in the mobile communications unit;

complying with a request made by the mobile communications unit to enter said security code;

comparing in the mobile communications unit the requested security code with the chosen security code;

making a comparison in the mobile communications unit between the registered user identity and the terminal identity when the requested security code does not agree with the chosen security code;

storing the registered user identity in the mobile communications unit when the registered user identity and the terminal identity do not match one another;

transmitting from the mobile communications unit the stored user identity and the terminal identity; and     receiving the registered, stored user identity and the terminal identity in a service node.

2. A method according to claim 1, further comprising the steps of:

repeating the transmission from the mobile communications unit of said stored user identity and said terminal identity;

sending a response signal from the service node;

receiving the response signal in the mobile communications unit; and     ceasing the transmission of the stored user identity and the terminal identity from the mobile communications unit.

3. A method according to claim 2, the registered user identity and the terminal identity are transmitted repeatedly from the mobile communications unit at regular time intervals.

4. A method according to claim 1, in which the user having the terminal identity is registered in the service node, further comprising the steps of:

identifying the registered authorized owner of the terminal identity in the service node; and     localizing the user of the mobile communications unit in the service node.

5. A method according to claim 4, wherein the operator possesses a data storage device, further comprising the steps of:

storing in said data storage device user information relating to the various users and     tying said user information to the user identity of respective users.

6. A method according to claim 5, wherein said user information relating to respective users includes the name, address, telephone number and personal identification number of respective users.

7. A method according to claim 5, wherein the mobile communications unit is in the possession of the user, and the registered user identity includes a unique identification identity that identifies the operator of the subscription to which a respective user card is tied, wherein localization of the user of the mobile communications unit in the service node comprises the steps of:

identifying the operator in the service node by reading the identification identity from the registered user identity;

reading the user information tied to the user identity registered in the data storage device of the operator;

transferring said user information from the operator to the service node; and     identifying the user in the service node.

8. A method according to claim 1, wherein linking of the terminal identity of the mobile communications unit with the user identity of the authorized user card produces a first result by carrying out a predetermined operation between said terminal identity and said user identity, wherein the comparison carried out in the mobile communications unit between the registered user identity and the terminal identity includes the steps of:

carrying out said predetermined operation on the registered user identity and the terminal identity and therewith obtain a second result; and     making a comparison between the first result and the second result.

9. A method according to claim 8, wherein the registered user identity and the terminal identity match one another when the first result is identical to the second result.

10. A method according to claim 1, wherein the comparison made in the mobile communications unit between the requested security code and the chosen security code comprises the steps of:

writing the requested security code into the mobile communications unit; and     determining in said unit whether or not the requested security code is identical to the chosen security code.

11. A method according to claim 1, wherein the service node is an insurance company or the operator tied to the authorized user card.

12. In a mobile communications system an arrangement for identifying a user of a mobile communications unit with a terminal identity and a security code chosen by an authorized user, wherein the arrangement includes a card space intended to receive a user card which has a user identity and which is tied to a subscription of an operator, wherein one of the user identities corresponding to an authorized user card is linked to the terminal identity, and wherein the arrangement further includes:

means for storing said terminal identity and said chosen security code;

means for registering the user identity of the user card placed in said card space;

means for requesting the insertion of the security code;

means for displaying the security code insertion request;

means for comparing the requested security code with the chosen security code;

means for comparing the registered user identity with the terminal identity;

means for storing the registered user identity;

means for dispatching the stored user identity and the terminal identity from the mobile communications unit;

means for registering in a service node the user entitled to the terminal identity; and     means for receiving the dispatched registered user identity and the terminal identity.

13. An arrangement according to claim 12, further comprising:
- means for storing the registered user identity and the terminal identity;
- means for sending a response signal;
- response signal receiving means; and
- means for localizing the user of the mobile communications unit.

14. An arrangement according to claim 13, wherein the operator has a data storage device, wherein the data storage device is adapted to store user information related to the different users, and said user information is tied to the user identity of respective users.

15. An arrangement according to claim 14, wherein the service node includes means for receiving from the operator user information tied to the registered user identity.

16. An arrangement according to claim 15, wherein the user has the mobile communications unit in his possession, and wherein said means for localizing the mobile communications unit in the service node includes:
- operator identification means; and
- means for identifying the user from the user information received from the operator.

17. An arrangement according to claim 13, wherein the device for storing the registered user identity and the terminal identity in the service node includes means for displaying the registered user identity and the terminal identity.

18. An arrangement according to claim 12 wherein the user identity is a SIM-code and the user card is a SIM-card in the GSM system.

19. A system for identifying a user of a mobile communications units comprising:
- a memory for storing a security code and a terminal identity;
- a card space for accepting a user card;
- a first comparator unit for comparing said security code to a user inputted security code;
- a second comparator unit for comparing said terminal identity with an identity associated with said user card; and
- a transmitter,
- wherein if said first comparator unit determines that said user inputted security code does not match said security code and said second comparator unit determines that said identity associated with said user card does not match said terminal identity then said transmitter transmits a message to a service node.

20. A system according to claim 19, wherein said message comprises the terminal identity and the identity associated with said user card.

21. A system according to claim 19, wherein said message is transmitted until a response signal is received from said service node.

22. A system according to claim 19, wherein a registered authorized owner of the terminal identity is identified in said service node and a user of the mobile communications unit is localized in the service node.

23. A system according to claim 19, wherein said service node stores user information which corresponds to said identity associated with said user card, said user information includes a name, address, telephone number and personal identification number of a user.

* * * * *